Patented Aug. 11, 1925.

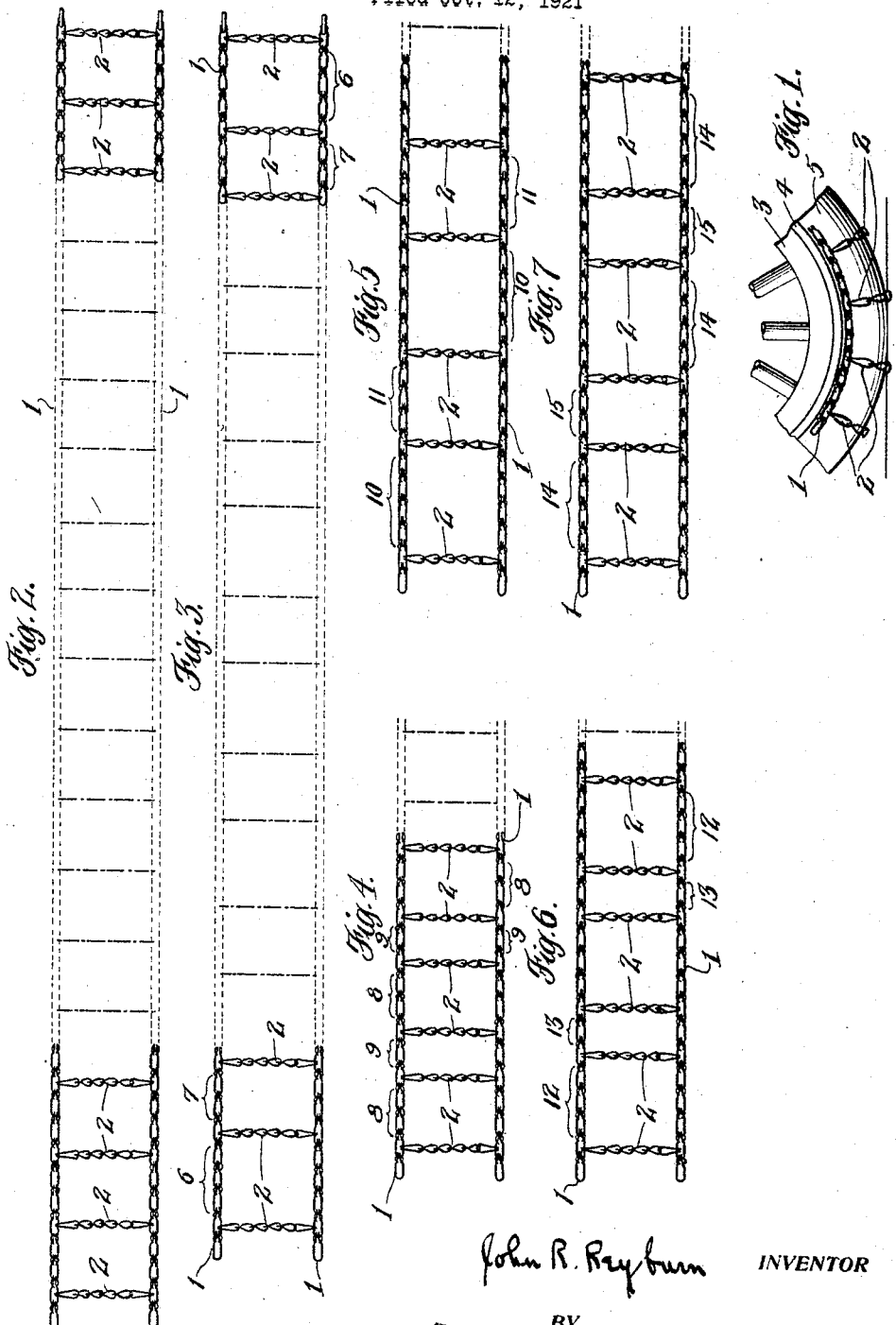

1,548,955

UNITED STATES PATENT OFFICE.

JOHN R. REYBURN, OF FAIRFIELD, CONNECTICUT, ASSIGNOR TO AMERICAN CHAIN COMPANY, INC., A CORPORATION OF NEW YORK.

ANTISKIDDING DEVICE FOR MOTOR VEHICLES.

Application filed October 12, 1921. Serial No. 507,267.

*To all whom it may concern:*

Be it known that I, JOHN R. REYBURN, a citizen of the United States, residing at Fairfield, in the county of Fairfield, State of Connecticut, United States of America, have invented certain new and useful Improvements in Antiskidding Devices for Motor Vehicles, of which the following, taken in connection with the accompanying drawings, is a specification.

My invention relates to automobile or motor vehicle anti-skidding devices, and is particularly applicable to the type of antiskidding device characterized by a series of tread members circumferentially spaced about and extending transversely of the periphery or tread of the tire.

As is well known to users of automobiles, the employment of anti-skid devices of the nature above described is accompanied under certain conditions by a more or less intense vibration of the parts of the automobile, which not only produces a noise annoying to the occupants, but also subjects the parts, highly stressed at the best, to a periodic racking motion, necessarily increasing the wear on the bearings, gears and joints, and consequently shortening their useful life. The conditions under which this vibration takes place vary, but it may be said that they are most commonly produced when the car is travelling over a smooth pavement at speeds ranging from fifteen to twenty-five miles an hour. Other conditions, however, such as the weight of the car and of its parts, the internal pressure on the tires, and irregularities in speed may intervene to influence the production of these vibrations.

My object, broadly stated, is to make provision for reducing the vibrations mentioned, and, while I do not intend to be confined to any specific theory as to the principles which are involved in the phenomena with which the invention deals or as to the mode of operation of the means which I propose for controlling these phenomena, I will briefly set forth my theory as to their causes, the principles upon which they may be controlled and the operation of the specific means which I herein describe to accomplish my object. The action of an anti-skid chain, such as is illustrated in Figure 1 of the accompanying drawings, hereinafter more particularly referred to, will serve as a concrete example in connection with my explanation.

As is well-known, pneumatic rubber tires have a flexible and resilient tread which tends to conform to the road surface, the contact portion being substantially flattened out to an extent varying with the internal pressure of the tire, the hardness or softness of the rubber tread, its flexibility and the axle pressure. The standard spacing of cross chains in devices of the type under consideration is about the length of this flattening so that at least one cross chain is always in firm contact with the road. The axle pressure is transmitted to the road in part directly through the flattened portion of the tire in contact with the road and in part indirectly through the indented portion of the tire to the chain engaged, and thence to the road. The traction afforded by a cross chain depends upon its bite on the road surface, the gripping power of this bite in turn being a function of the internal pressure of the tire, the hardness of the road, the pressure on the cross chain and small road surface irregularities. I have found, for instance, that on a hot and dry summer day, chains on a tire having an internal gage pressure per square inch of twenty pounds per inch of nominal sectional tire diameter, will make a perceptible indentation in a bithulithic road. On the other hand, if the internal pressure is approximately five pounds per square inch of nominal sectional diameter, the bulk of the axle pressure reaches the road surface directly through the tire inasmuch as the tire flattens out more at the area of road contact and is indented more readily by the cross chain beneath it. In the latter case, the road mentioned above may be indented very little and the traction offered by the chain will depend largerly on its engagement with existing small irregularities, the resistance offered by this engagement depending partly upon the pressure and partly upon the elevation of the irregularities. On a smooth slippery road the chain friction is admittedly preferable to tire friction and hence the desirability of increasing the chain pressure on the road at the expense of tire pressure on the road. Doing so, however, by such methods as the use of thicker or larger traction members immediately increases the upward thrust by the chain on the tire, and hence tendency to rough riding and vibration with its personal and mechanical objections ensues.

Assume an automobile equipped with tire chains of the type above referred to, running at low speed, for instance, four miles an hour: When the tire meets a cross chain, the tire is slightly indented at first by its portions first coming in contact with the cross chain and gradually more and more as the axle approaches a position directly over the cross chain. After the axle passes this position, the indentation decreases to zero and meanwhile another chain begins a repetition of this cycle. On the average hard road under normal operating conditions of tire pressure, axle weight, etc., the pressure between the tire and the cross chain increases sufficiently to substantially elevate the axle and maintain it in an elevated position, and then on decreasing, allows the axle to drop nearly to its "at rest" position, when another cross chain comes into action. It is evident that the cross chains exert a succession of upward impulses, their time of application being dependent upon their spacing in the tire chain and the speed of the car. As in the case of all bodies, automobile parts or units are characterized by a natural periodicity to vibration, that is, a certain speed of back and forth movement may be developed by the application of successive impulses, each of very slight intensity and perhaps quite insufficient in itself to produce any extended vibration, provided the successive impulses are applied at the proper frequency and in the correct direction. The rear axle of an automobile pressed downward by the weight of the body acting through the springs and the connected parts, such as wheels, driving shaft, torque and radius rods, have their own natural rates of vibration, one or more of which in the ordinary passenger automobile I have found is intensely developed at a speed between fifteen and twenty-five miles an hour. This rate of vibration corresponds to a frequency of from 66 to 110 vibrations per second on small cars and from about 40 to 70 vibrations per second on large cars.

The vibration at the speeds last mentioned differs from the up and down motion that occurs at the slow speeds previously referred to, such as four miles an hour. In the latter case the tires climb on to the cross chain, remain supported on it momentarily and then return to the preceding elevation. The effect is similar to ascending and descending a series of oppositely inclined slopes with flattened or rounded crests and troughs of considerable length.

As the car increases its speed from the low speed above mentioned, the up and down motion becomes more frequent, but of diminishing intensity until at perhaps 9 to 12 miles an hour it has disappeared. At these latter speeds cross chains are struck more sharply than at four miles an hour and the tire probably indents more at the engagement portion as a result, but the impulses are coming at the rate of about 45 per second on small cars and 28 per second on large cars, or in other words, are out of phase with the natural vibration of the parts affected, and hence no sympathetic vibration results. Smooth riding continues with increasing speed until a rate of perhaps 15 miles an hour is reached, when a decided vibration is felt, more of course in some cars than in others, and particularly intense in some closed cars of the sedan or coupé type. In many cars this vibration is accompanied by a harsh grinding noise, so severe that at times defective gears or bearings are suspected. This phenomenon I attribute to the resultant action of cross chains on two wheels.

When this sympathetic vibration has developed, the downward thrust of the tire on the road and chains alternately increases and diminishes at the rate of its natural vibrating frequency. Unfortunately, the maximum downward pressure occurs when the cross chains occupy relative positions as shown in Figure 1. That is, they are adjacent the extremities of the flattened portion of the tire where the intensity of pressure is less than near the mid position. Unfortunately also the minimum downward pressure occurs when the cross chains reach the mid position. By the employment of my invention I cause many of the cross chains to reach this mid position or a position close to it at times when this downward pressure is the maximum, many other cross chains when the pressure is intermediate the maximum and minimum, and the remaining cross chains when this pressure is a minimum, this effect occurring as the vibration begins to develop. The result of this increased pressure in cross chains is of course greater traction and greater resistance to skidding.

As above stated, my invention has for its general object the reduction of vibration resulting from the use of tire chains such as above described when the car to which they are applied is travelling at speeds such as to develop vibration of the parts.

Another object is the elimination or reduction of the disagreeable noise attendant upon this vibration.

A further object is an increase in traction and resistance to skidding.

Another object is to prolong the life of an automobile by reducing the periodic vibration to which its working works are subjected.

Referring to the drawings, Figure 1 is a side view of the segment of an automobile wheel and tire with a length of anti-skid chain applied thereto.

Figure 2 is a plan view partly diagrammatic of an anti-skid chain of a conventional type.

Figure 3 is a plan view partly diagrammatic of one form of my invention.

Figure 4 is a plan view partly diagrammatic of another form of my invention.

Figure 5 is a plan view partly diagrammatic of another form of my invention.

Figure 6 is a plan view partly diagrammatic of another form of my invention.

Figure 7 is a plan view partly diagrammatic of another form of my invention.

The conventional type of anti-skid chain shown in Figure 2 consists of the side chains 1, 1 united or joined in ladder form by the cross chains 2. The manner of application of this type of chain to an automobile wheel is shown in Figure 1, wherein the wheel is shown as including the felly 3, rim 4 and tire 5. It will be observed that in the conventional type of anti-skid chain shown in Figure 2, the cross chains are so spaced that two spacing links of the side chain intervene between successive cross chains.

In Figure 3 the cross chains are shown spaced alternately with three spacing links 6 of the side chain and then with two spacing links 7 of the side chain.

In Figure 4 which shows a preferred form, two spacing links 8 of the side chain of my invention alternate with one spacing link 9 of the side chain.

In Figure 5, four spacing links 10 alternate with three spacing links 11.

In Figure 6 three spacing links 12 alternate with one spacing link 13.

In Figure 7 four spacing links 14 alternate with two spacing links 15.

It must be understood that there is in practice a limit to the number of combinations of spacing that can be employed with the type of chain in connection with which my invention is described. In the first place, the cross chains must in all cases be close enough together so that at all times at least one cross chain is lying on the roadway between the tire and the surface of the road. This limitation is obviously imposed by the requirements for sufficient traction and resistance to skidding. Again, as the side members of this type of chain are composed of chain, it is customary and most practicable to stretch cross chains between the side chains between oppositely situated links of the latter though within this invention, the transverse chains may cross the tire diagonally. Therefore, any alteration of position of any cross chain must be through a distance of one link or multiples thereof. Of course, it will be obvious that under any circumstances wherein it is possible to position a side chain at any point desired, the only limitation that exists is that of maximum spacing created by the requirements for most effective traction. As applied to the type of anti-skidding devices consisting of two side chains of the usual length of links and cross chains stretched between them, I have found that under ordinary conditions the most desirable form is that shown in Figure 4, which consists of a spacing of two spacing links alternating with one spacing link. For any particular set of conditions, however, any desired spacing may be employed.

Having thus described my invention, I claim:

1. A chain tire grip comprising side members and tread members connected thereto at non-uniform intervals.

2. A chain tire grip comprising side members and tread members connected thereto at alternate spacings in the ratio not unity.

3. A non-skid device for vehicle wheels which includes a series of cross chains spaced about the periphery of the tire, in which the spacing of said cross chains is alternately in the ratio of three to two.

4. A non-skid device for vehicle wheels, which includes a pair of chains adapted to be positioned concentric with the wheel one on each side thereof and a tread consisting of cross chains, the spacing of said cross chains being in a ratio varying from unity.

In testimony whereof, I have signed this specification.

JOHN R. REYBURN.